Feb. 5, 1957 H. POMERNACKI 2,780,007
MASTER GEAR
Filed Oct. 12, 1954 2 Sheets-Sheet 2
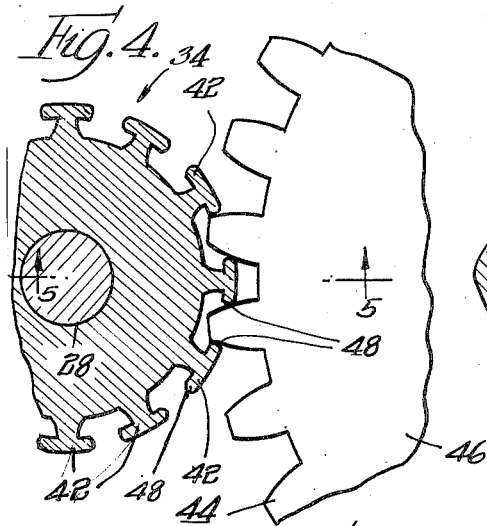
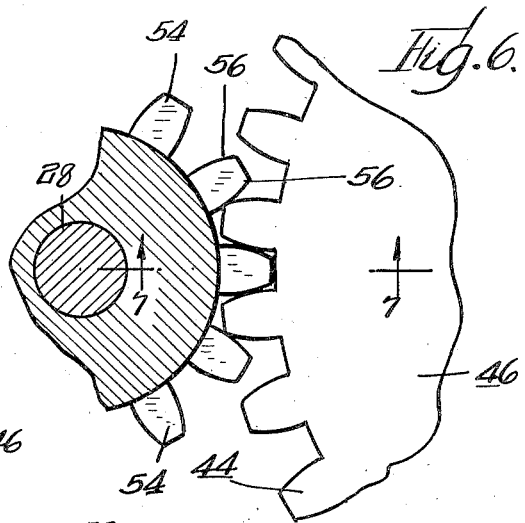
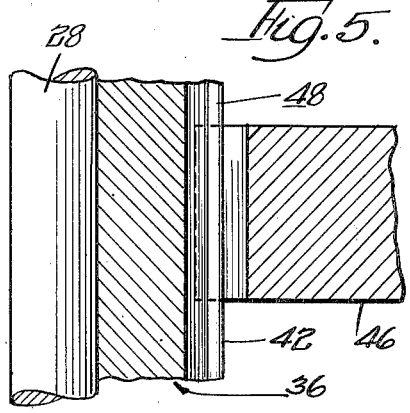
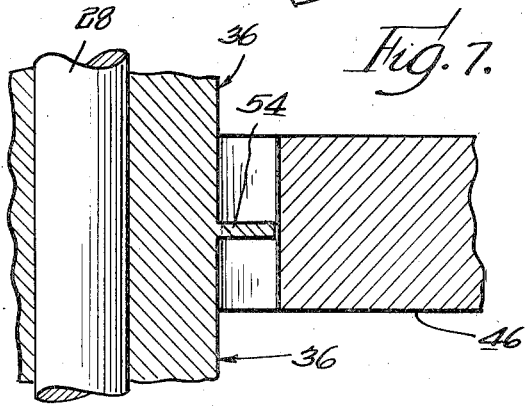
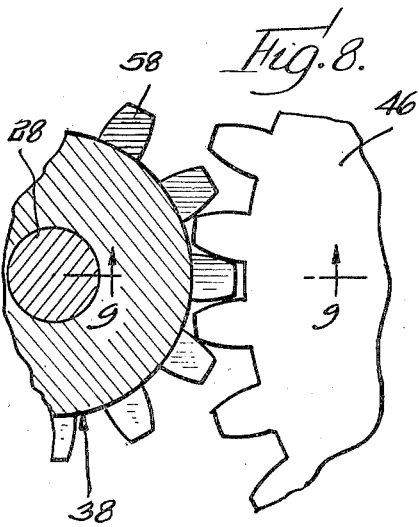
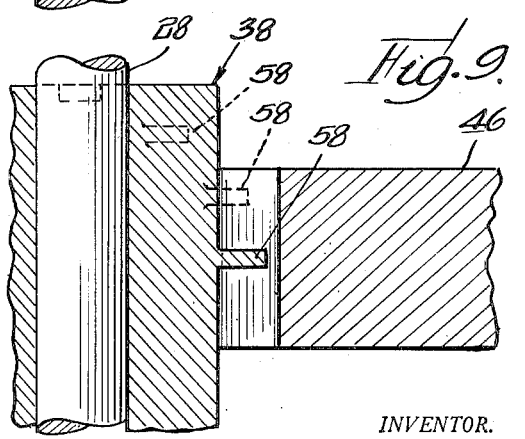
INVENTOR.
Henry Pomernacki
BY Olson & Trexler
Attys.

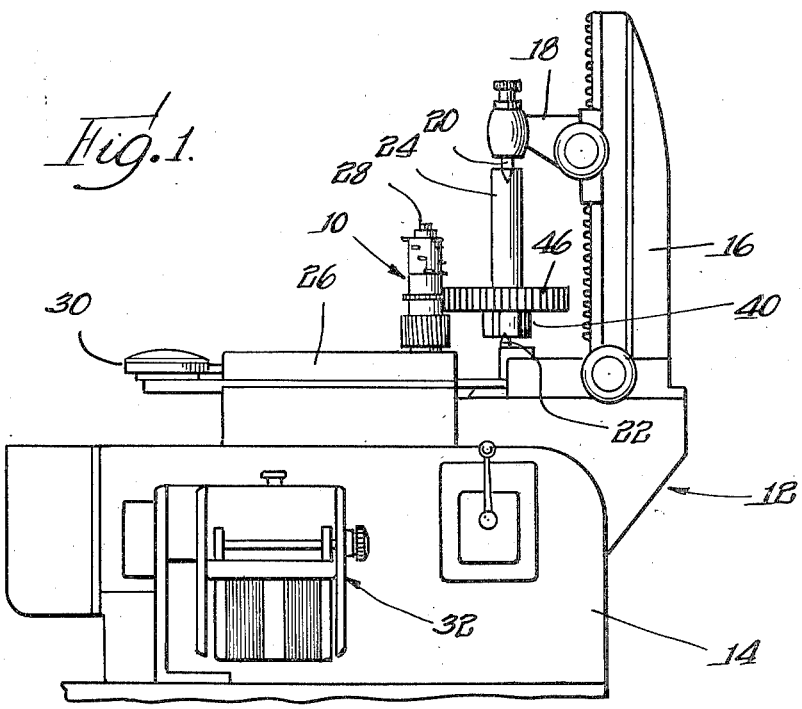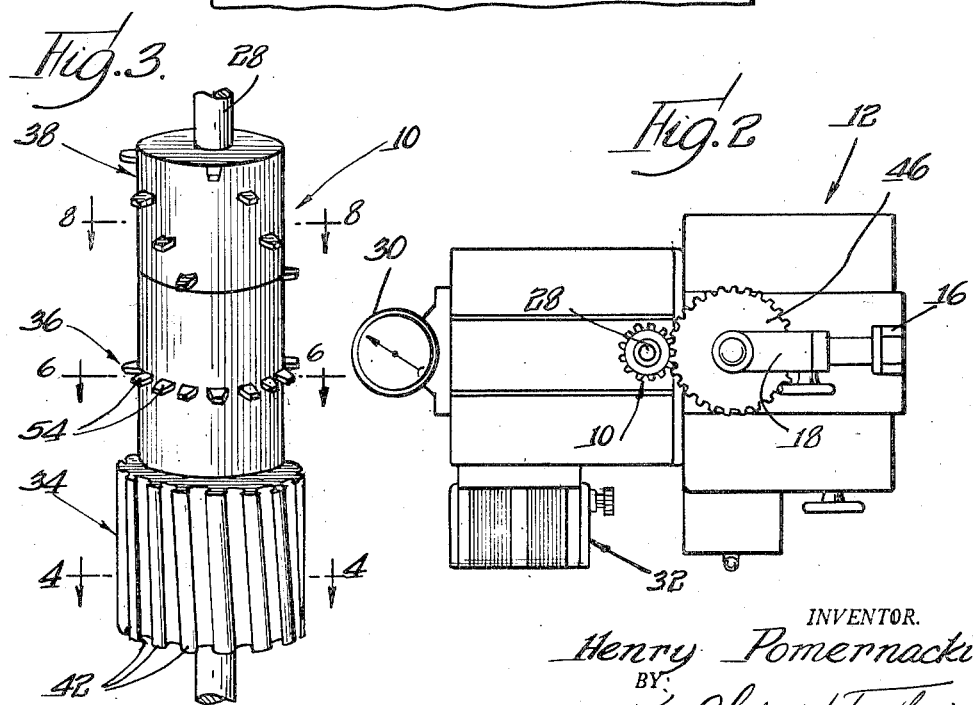

2,780,007
Patented Feb. 5, 1957

2,780,007
MASTER GEAR

Henry Pomernacki, Chicago, Ill., assignor to Illinois Tool Works, Chicago, Ill., a corporation of Illinois Application October 12, 1954, Serial No. 461,761

4 Claims. (Cl. 33—179.5)

The present invention relates to a novel device for checking teeth of gears and the like and more particularly, to a novel master gear adapted to be rolled with a workpiece gear to be checked.

As is well known, gears and the like have long been checked by rolling them with a master gear and by this checking operation, composite errors as a result of inaccuracies in the tooth profile, helix, tooth spacing and runout are determined. This method has the advantage over other methods heretofore used in that errors in one of the gear characteristics may be offset by the errors so that the gear checks out to be satisfactory and in that the checking operation may be conducted relatively rapidly. However, it is often desirable to check individual characteristics of a gear such as the offlead condition, the tooth profile and the gear helix and in the past, these individual checking operations have usually been performed by means of relatively slow and tedious procedures utilizing gauges or movably mounted inspection fingers operatively connected with a dial or recording instrument.

An important object of the present invention is to provide a novel device whereby individual characteristics of a gear such as lead, tooth profile and gear helix may be separately checked more rapidly and, therefore, more economically than would be possible when using devices heretofore in general use.

A more specific object of the present invention is to provide a novel master gear adapted to be rolled with a workpiece gear and which may be selectively positioned relative to the workpiece gear so as to individually check gear characteristics such as offlead condition, tooth profile and gear helix.

Another object of the present invention is to provide a novel master gear of the above described type which may be used in gear checking apparatus now in existence in place of conventional master gears.

Other objects and advantages of the present invention will become apparent from the following description and the accompanying drawings wherein:

Fig. 1 is an elevational view showing a gear checking apparatus with which the novel master gear of this invention may be used;

Fig. 2 is a plan view of the apparatus shown in Fig. 1;

Fig. 3 is an enlarged perspective view of a master gear embodying the principles of this invention;

Fig. 4 is a fragmentary cross sectional view of the master gear taken along line 4—4 in Fig. 3 and also showing the master gear in meshing relationship with a workpiece gear;

Fig. 5 is a cross sectional view taken along line 5—5 in Fig. 4;

Fig. 6 is a fragmentary cross sectional view of the master gear taken along line 6—6 in Fig. 3 and also showing the master gear in meshing relationship with a workpiece gear;

Fig. 7 is a cross sectional view taken along line 7—7 in Fig. 6;

Fig. 8 is a fragmentary cross sectional view of the master gear taken along line 8—8 in Fig. 3 and also showing this portion of the master gear in meshing relationship with a workpiece gear; and Fig. 9 is a fragmentary cross sectional view taken along line 9—9 in Fig. 8.

Referring now more specifically to the drawings wherein like parts are designated by the same numerals throughout the various figures, a master gear 10 embodying the principles of this invention is shown best in Fig. 3 and is adapted to be used with a gear checking apparatus 12 shown in Figs. 1 and 2. The apparatus 12 may be of any known construction which includes a base 14, an upstanding pedestal 16 adjustably mounted on the base, and an adjustable headstock 18 on the pedestal carrying a center 20 which is adapted to cooperate with the center 22 on the pedestal carriage for supporting a workpiece mounting mandrel 24. In addition, the apparatus includes a slide 26 for carrying the master gear by means of an upstanding spindle 28. The slide is spring biased in a known manner so as to urge the master gear resiliently against the workpiece whereby any inaccuracies in the workpiece will cause a shifting of the slide which will be shown by a conventional dial indicator 30 and/or on a conventional recording mechanism 32. In the embodiment illustrated, the master gear has sections 34, 36 and 38, each with different types of teeth for checking different characteristics of a workpiece gear tooth. The workpiece is selectively positioned for engagement with the teeth on one of the master gear sections by shifting the workpiece gear along the mandrel 24 and this may be accomplished by using one or more spacing blocks 40.

In the embodiment illustrated, the section 34 of the master gear is provided with a plurality of helical tooth elements 42 equally spaced circumferentially around the gear for checking the offlead condition of a helical workpiece gear. As will be understood, carryover in helical gears is obtained not only from the tooth form but also from the helix. Thus, in order to check the helix or offlead condition of a workpiece gear, the tooth elements 42 are formed with substantially no involute or other conventional tooth profile so that when the gear section 34 is rolled with a workpiece gear, substantially only helical carryover is obtained and the offlead condition will be indicated by the dial 30 or on the recording mechanism 32.

In Figs. 4 and 5, the master gear section 34 is shown disposed in meshing relationship with teeth 44 of a workpiece gear 46. For the purpose of illustrating the present invention, the teeth 44 are shown as involute teeth but it should be understood that the master gear of this invention may be modified to check other tooth forms. As mentioned above, the tooth elements 42 of the master gear are formed so that they have substantially no tooth or involute profile. More specifically, by referring to Fig. 4, it will be seen that the addendum of each tooth element 42 has been removed and the dedendum of each tooth element has been undercut so that the tooth elements are provided with workpiece engaging surfaces or faces 48 in the form of narrow bands which extend axially of the gear. Preferably, the tooth elements 42 are formed so that their band-like faces are disposed substantially at the pitch circle of the gear.

The master gear section 36 is provided with a plurality of tooth elements 54 which are formed so as to substantially eliminate the helical carryover and to check only the profiles of the workpiece gear teeth. More specifically, the tooth elements 54 are formed with narrow bandlike workpiece engaging faces or surfaces 56 extending generally radially of the master gear or, in other words, the end faces of the tooth elements 54 are removed so that only a narrow band of the tooth profile is left as shown in Figs. 3 and 7. As shown in Fig. 6, the tooth elements 54 are formed so as to check the full depth of the workpiece tooth element.

The master gear section 38 is provided with a plurality of narrow tooth elements 58 which are circumferentially and helically spaced on the gear body. As shown best in Figs. 8 and 9, the tooth elements 58 are stubbed so that the carryover provided by the involute or other form thereof is just over one in order to permit the tooth elements to roll with the workpiece gear and, at the same time, individually check the workpiece gear. With the tooth elements 58 formed and arranged in the manner shown and described, any tapering or off-parallel condition of the workpiece teeth along the axis of the workpiece gear will cause a displacement of the master gear from the position a conventional composite check-type master gear would occupy, and the amount of this displacement indicates the condition of the gear helix. The master gear section 38 is particularly useful for checking the gear helix of workpiece gears having low helix angles and may also be used for checking the parallel relationship of spur gear teeth.

From the above description, it is seen that the present invention has provided a novel master gear with which separate elements of a workpiece gear may be individually checked in a rapid and economical manner. More specifically, it is seen that the present invention has provided a novel master gear having a plurality of sets of tooth elements spaced axially thereof with each set of tooth elements being adapted to roll with a workpiece gear and being formed to check a different characteristic of the workpiece gear.

While the preferred embodiment of the present invention has been shown and described herein, it is obvious that many structural details may be changed without departing from the spirit and scope of the appended claims. For example, while the sections 34, 36 and 38 have been shown as incorporated in a single master gear, it is contemplated that these sections may be made separately from each other. In this event, the separate sections of the master gear may be mounted one at a time on the gear checking apparatus or they may be mounted on a single spindle and positioned on the checking apparatus as a unit. In addition, it is contemplated that a fourth section may be provided for the master gear and this section would have conventional teeth for obtaining a composite check of the workpiece gear.

The invention is claimed as follows:

1. A master gear comprising elongated body means, a plurality of circumferentially spaced helical tooth elements on said body means for meshing with a workpiece gear, each of said helical tooth elements having its addendum substantially removed, its dedendum recessed and a band-like workpiece engaging surface which is narrow generally radially of the master gear and which extends generally longitudinally of the master gear for checking the lead condition of the workpiece gear, a plurality of additional tooth elements circumferentially spaced on said body means and axially spaced from said first mentioned tooth elements, each of said second mentioned tooth elements having a narrow band-like workpiece engaging face with an axial length substantially less than the axial length of workpiece teeth for checking the profile of said workpiece teeth, and additional tooth elements circumferentially spaced on said body means and axially spaced from said first and second mentioned tooth elements, each of said third mentioned tooth elements having a narrow band-like workpiece engaging face with an axial length substantially less than the axial length of workpiece teeth, said third mentioned tooth elements being helically arranged for checking possible tapering and off-parallel condition of the workpiece teeth.

2. A master gear adapted to be rolled with a workpiece gear or the like comprising a gear body, and a plurality of circumferentially spaced helical tooth elements on said body, each of said tooth elements having its addendum substantially removed, its dedendum recessed and a band-like workpiece engaging surface which is narrow in a direction extending generally radially of said body and which extends generally longitudinally of said body for checking the lead of the workpiece gear.

3. A master gear adapted to be rolled with a workpiece gear comprising a gear body, and a plurality of circumferentially spaced helical tooth elements on said body for meshing with workpiece gear teeth, each of said helical tooth elements having its addendum substantially removed, its dedendum recessed and a radially narrow band of workpiece engaging tooth surface disposed substantially at the master gear pitch circle for checking the lead of the workpiece gear.

4. A master gear for measuring the tapering and off-parallel condition of teeth on a workpiece gear, which master gear is adapted to be rolled with a workpiece gear comprising a gear body, a plurality of circumferentially spaced tooth elements on said gear body, each of said tooth elements presenting a narrow band-like workpiece-engaging face of minute axial extent, said engaging faces extending generally radially of said gear body and having curved flanks and being stubbed by removal of a portion of their addendums, thereby providing a carryover only slightly greater than one, said tooth elements being helically arranged on said gear body.

References Cited in the file of this patent
UNITED STATES PATENTS

| 2,512,696 | Tappert | June 27, 1950 |
| 2,661,542 | Beam | Dec. 8, 1953 |

FOREIGN PATENTS

| 203,196 | Germany | Oct. 22, 1908 |